United States Patent
Ning et al.

(10) Patent No.: US 9,804,824 B1
(45) Date of Patent: Oct. 31, 2017

(54) SYSTEM AND METHOD FOR CONTROLLING FLOW OF DATA THROUGH A BUFFER TO INCREASE TIME A BRIDGE IS IN A LOW POWER STATE

(71) Applicant: Marvell International LTD., Hamilton (BM)

(72) Inventors: Xiongzhi Ning, Karlsruhe (DE); Steffen Dolling, Ditzingen (DE)

(73) Assignee: MARVELL INTERNATIONAL LTD., Hamilton (BM)

( * ) Notice: Subject to any disclaimer, the term of this patent is extended or adjusted under 35 U.S.C. 154(b) by 657 days.

(21) Appl. No.: 14/299,366

(22) Filed: Jun. 9, 2014

Related U.S. Application Data

(60) Provisional application No. 61/836,591, filed on Jun. 18, 2013.

(51) Int. Cl.
*G06F 5/12* (2006.01)
*G06F 13/32* (2006.01)

(52) U.S. Cl.
CPC ................ *G06F 5/12* (2013.01); *G06F 13/32* (2013.01)

(58) Field of Classification Search
CPC ........................................................ G06F 5/12
See application file for complete search history.

(56) References Cited

U.S. PATENT DOCUMENTS

| | | | | |
|---|---|---|---|---|
| 6,111,875 A * | 8/2000 | Kerstein | ............. | G06F 13/1605 370/389 |
| 7,630,309 B1 * | 12/2009 | Lim | ......................... | G06F 5/06 370/230.1 |
| 2002/0110137 A1 * | 8/2002 | Nie | ......................... | H04L 47/10 370/429 |
| 2005/0210174 A1 * | 9/2005 | Hofmann | ................ | G06F 13/24 710/263 |
| 2005/0251588 A1 * | 11/2005 | Hoch | .................... | G06F 1/3221 710/5 |
| 2009/0077401 A1 * | 3/2009 | Tsai | ...................... | G06F 1/3209 713/320 |

OTHER PUBLICATIONS

Intel Corporation;PCI-SIG Engineering Change Notice; "Optimized Buffer Flush/Fill" Updated Apr. 30, 2009, original request: Feb. 8, 2008.

* cited by examiner

*Primary Examiner* — Glenn A Auve
*Assistant Examiner* — Herve Iradukunda

(57) ABSTRACT

A system including a bus, a buffer, a bridge and a module. The bus is connected to multiple devices. The buffer is connected to the bus. The buffer is configured to transfer data to or receive the data from one or more of the devices, forward the data during a forwarding mode, and receive the data during a gathering mode. The module is configured to determine whether a first condition and/or a second condition exist. Based on whether the first condition exists, the module is configures the bridge to transfer the data from the buffer to a host system or transitions the buffer from the gathering mode to the forwarding mode to forward the data from the buffer to the one or more of the devices. Based on whether the second condition exists, the module is configured to transition the buffer from the forwarding mode to the gathering mode.

22 Claims, 4 Drawing Sheets

SYSTEM AND METHOD FOR CONTROLLING FLOW OF DATA THROUGH A BUFFER TO INCREASE TIME A BRIDGE IS IN A LOW POWER STATE

CROSS-REFERENCE TO RELATED APPLICATIONS

This application claims the benefit of U.S. Provisional Application No. 61/836,591, filed on Jun. 18, 2013. The entire disclosure of the application referenced above is incorporated herein by reference.

FIELD

The present disclosure relates to peripheral component interconnect express devices and, more particularly, to effective bandwidth utilization of PCIe devices and durations in which PCIe devices are in low power states.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A peripheral component interconnect express (PCIe) bridge interconnects a host system to peripheral devices. The PCIe bridge transfers data between the host system and the peripheral devices via an interface bus (e.g., an advanced extensible interface (AXI) bµs). The peripheral devices can include Ethernet devices, universal serial bus (USB) devices, serial advanced technology attachment (SATA) devices, and/or wireless local area network (WLAN) devices. The PCIe bridge may also transfer data between the host system and PCIe-bus-master capable modules such as interrupt controllers and embedded central processing units (CPUs). A first-in-first-out (FIFO) buffer can be connected between the PCIe bridge and the interface bus. Interconnection of the host system, the peripheral devices and the PCIe-bus-master capable modules can be realized via the interface bus. As an example, each of the peripheral devices may initiate data transfer requests to the host system via the FIFO buffer, the interface bus and the PCIe bridge. Data including user data, data transfer requests and control information can be transferred between the peripheral devices and a memory in the host system.

A PCIe bridge can operate in an active state (or state L0) and in a low power state (or state L1). The PCIe bridge including a physical layer (PHY) device and a controller of the PCIe bridge is fully powered during the active state. During the low power state, one or more PCIe components of the PCIe bridge can be powered down and/or clock gating to the PCIe components may be stopped. Clock gating refers to supplying a clock signal to one or more components.

Data is transferred during the active state of the PCIe bridge. If no data is being transferred, the PCIe bridge can transition from the active state to the low power state to reduce power consumption. A period during which the PCIe bridge transitions from the active state to the low power state is referred to as an entry latency period $t_{enter}$. A period during which the PCIe bridge transitions from the low power state to the active state is referred to as an exit latency period $t_{exit}$. For a typical PCIe bridge, the entry latency period can be 2 micro-seconds (µs) in length and the exit latency period can be 16 µs in length.

Data transfer bandwidth of a PCI bridge is based on several parameters. The parameters include data width of a bus, frequency of a bus, and number of parallel PCIe lanes. A PCIe bridge is typically designed to realize a maximum data throughput under worst case conditions. In other words, bandwidth utilization for data transfers can be nearly 100%. However, bandwidth utilization of a PCIe bridge is typically less than 100%.

SUMMARY

A system is provided and includes a bus, a buffer, a bridge and a module. The bus is connected to multiple devices. The buffer is connected to the bus. The buffer is configured to transfer data to or receive the data from one or more of the devices, forward the data during a forwarding mode, and receive the data during a gathering mode. The module is configured to determine whether a first condition and/or a second condition exist. Based on whether the first condition exists, the module is configures the bridge to transfer the data from the buffer to a host system or transitions the buffer from the gathering mode to the forwarding mode to forward the data from the buffer to the one or more of the devices. Based on whether the second condition exists, the module is configured to transition the buffer from the forwarding mode to the gathering mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the first condition exists, determine whether a timer has expired or a value of the timer is greater than or equal to a predetermined value. The module is configured to, if the timer has expired or the value of the timer is greater than or equal to the predetermined value, transition the bridge from the low power state to the active state and transition the buffer from the gathering mode to the forwarding mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the first condition exists, determine whether a fill level of the buffer is greater than or equal to a predetermined fill level. The module is configured to, if the fill level of the buffer is greater than or equal to the predetermined fill level, transition the bridge from the low power state to the active state and transition the buffer from the gathering mode to the forwarding mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the first condition exists, determine whether an interrupt has been received by the bridge or the buffer. The module is configured to, if an interrupt has been received at the bridge or buffer, transition the bridge from the low power state to the active state and transition the buffer from the gathering mode to the forwarding mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the first condition exists, determine whether a request has been received by the bridge from the host system to enable data forwarding. The module is configured to, if the request has been received by the bridge, transition the bridge from the low power state to the active state and transition the buffer from the gathering mode to the forwarding mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the first condition exists, determine whether no data has been received by the buffer for a predetermined period. The module is configured to, if no data has been received by the buffer for the predetermined period, transition the bridge from the low power state to the active state and transition the buffer from the gathering mode to the forwarding mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to determine whether multiple conditions exist, wherein the conditions include the first condition. The module is configured to, if the conditions exist, transition the bridge from the low power state to the active state and transition the buffer from the gathering mode to the forwarding mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the second condition exists, determine whether a timer has expired or a value of the timer is greater than or equal to a predetermined value. The module is configured to, if the timer has expired or the value of the timer is greater than or equal to the predetermined value, transition the bridge from the active state to the low power state and transition the buffer from the forwarding mode to the gathering mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the second condition exists, determine whether a fill level of the buffer is less than a predetermined fill level. The module is configured to, if the fill level of the buffer is less than the predetermined fill level, transition the bridge from the active state to the low power state and transition the buffer from the forwarding mode to the gathering mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the second condition exists, determine whether an interrupt has been received by the bridge or the buffer. The module is configured to, if an interrupt has been received by the bridge or the buffer, transition the bridge from the active state to the low power state and transition the buffer from the forwarding mode to the gathering mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the second condition exists, determine whether a request has been received by the bridge from the host system to disable data forwarding. The module is configured to, if the request has been received by the bridge from the host system to disable data forwarding, transition the bridge from the active state to the low power state and transition the buffer from the forwarding mode to the gathering mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to, in determining whether the second condition exists, determine whether more than a predetermined number of data transfer requests have been forwarded from the buffer or satisfied. The module is configured to, if more than the predetermined number of data transfer requests have been forwarded from the buffer or satisfied, transition the bridge from the active state to the low power state and transition the buffer from the forwarding mode to the gathering mode.

In other features, the buffer does not forward the data during the gathering mode. The bridge is configured to operate in an active state and a low power state. During the active state, the bridge is configured to transfer the data from the buffer to the host system or the buffer is configured to forward the data to the one or more of the devices. The module is configured to determine whether multiple conditions exist, where the conditions include the second condition. The module is configured to, if the conditions exist, transition the bridge from the active state to the low power state and transition the buffer from the forwarding mode to the gathering mode.

In other features, a method is provided and includes: via a buffer, transferring data to or receiving the data from multiple devices, where the data is received at the buffer during a gathering mode, and where the buffer is connected to the devices via a bus; determining whether a first condition and/or a second condition exists; based on whether the first condition exists, transferring the data from the buffer to a host system via a bridge or transitioning the buffer from the gathering mode to the forwarding mode to forward the data from the buffer to the one or more of the devices; and based on whether the second condition exists, transitioning the buffer from the forwarding mode to the gathering mode.

In other features, the method further includes: forwarding the data from the buffer during a forwarding mode, where the data is not forwarded from the buffer during the gathering mode; during an active state, transferring the data from the buffer to the host system via the bridge or forwarding the data from the buffer to the one or more of the devices; determining whether multiple conditions exist, where the conditions include the first condition, a timer being expired, a value of the timer being greater than or equal to a predetermined value, no data being received by the buffer for a predetermined period, a fill level of the buffer being greater than or equal to a predetermined fill level, an interrupt being received by the bridge or the buffer, and a request being received by the bridge from the host system to enable data forwarding; and if the conditions exist, transitioning the bridge from a low power state to the active state and transitioning the buffer from the gathering mode to the forwarding mode.

In other features, the method further includes: forwarding the data from the buffer during a forwarding mode, where the data is not forwarded from the buffer during the gathering mode; during an active state, transferring the data from the buffer to the host system via the bridge or forwarding the data from the buffer to the one or more of the devices; determining whether conditions exist, where the conditions include the second condition, a timer being expired, a value of the timer being greater than or equal to a predetermined value, a fill level of the buffer being less than or equal to a predetermined fill level, an interrupt being received by the bridge or the buffer, a request being received by the bridge from the host system to disable data forwarding, and more than a predetermined number of data transfer requests being forwarded from the buffer or satisfied; and if the conditions exist, transitioning the bridge from the active state to a low power state and transitioning the buffer from the forwarding mode to the gathering mode.

In other features, the method further includes: forwarding the data from the buffer during a forwarding mode, where the data is not forwarded from the buffer during the gathering mode; during an active state, transferring the data from the buffer to the host system via the bridge or forwarding the data from the buffer to the one or more of the devices; determining whether first conditions exist, where the first conditions include the first condition; and if the first conditions exist, transitioning the bridge from a low power state to the active state and transitioning the buffer from the gathering mode to the forwarding mode. The method further includes: determining whether second conditions exist, where the second conditions include the second condition; and if the second conditions exist, transitioning the bridge from the active state to the low power state and transitioning the buffer from the forwarding mode to the gathering mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Figure 1:
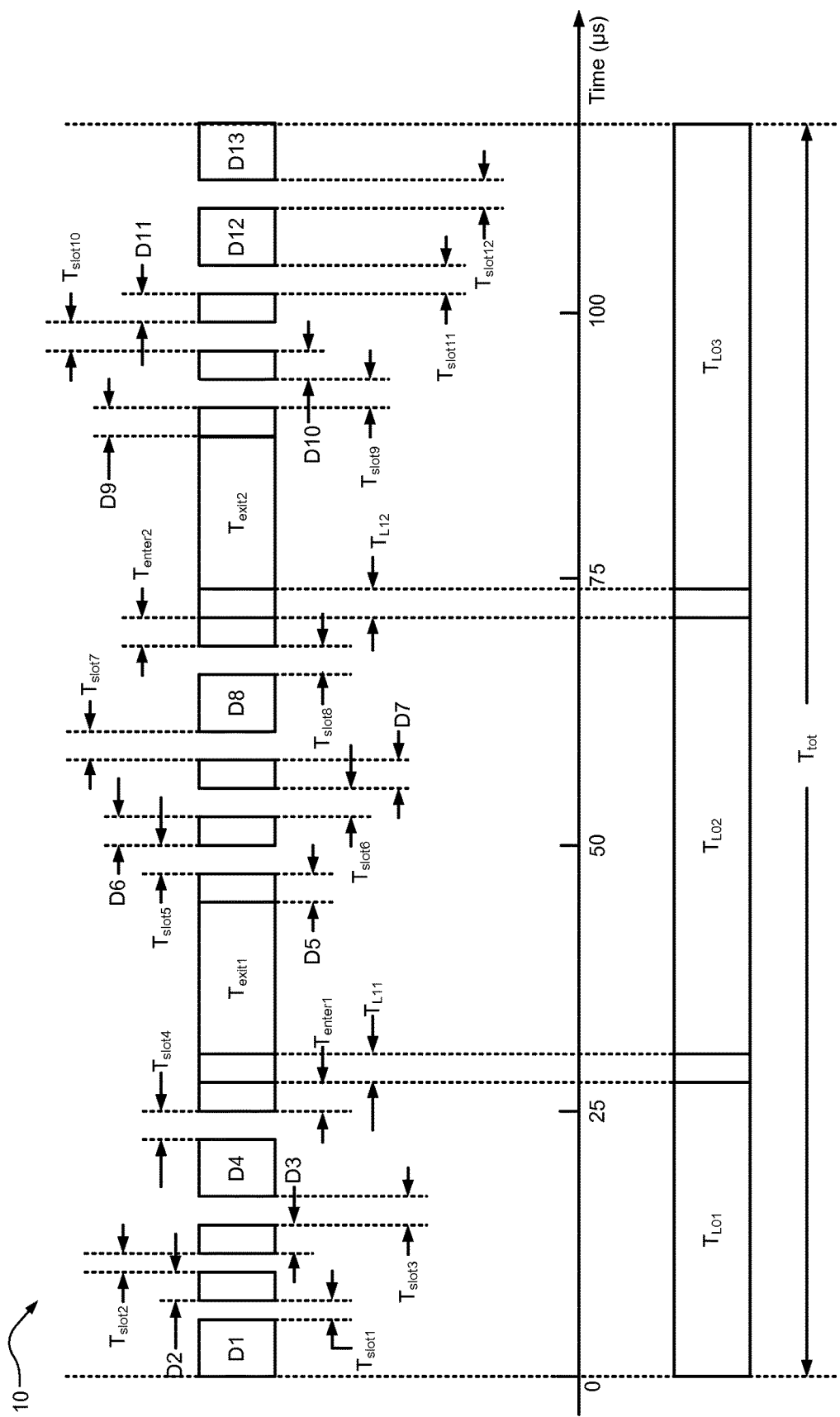
FIG. 1 is a timing diagram illustrating an example of effective bandwidth utilization and a low power ratio for a PCIe bridge.

FIG. 1 shows a timing diagram 10 illustrating an example of effective bandwidth utilization and a low power ratio for a PCIe bridge. For the example of FIG. 1, the PCIe bridge has a single lane of data traffic between the PCIe bridge and a FIFO buffer. Active state periods $T_{L01-3}$, low power state periods $T_{L11-2}$, entry latency periods $T_{enter1-2}$, exit latency periods $T_{exit1-2}$, and data transfer event periods D1-13 are identified. Each of the data transfer event periods D1-13 may include transferring a respective data transfer request and/or data associated with the corresponding data transfer request. The effective bandwidth utilization refers to a total amount of time during which data is transferred (e.g., 44.85 µs) relative to a total amount of time $T_{tot}$ to perform the data transfer events (e.g., 115 µs) associated with the data transfer event periods D1-13.

The low power ratio is a total amount of time in a low power state (e.g., 4.6 µs) over the total amount of time to perform the data transfer events (e.g., 115 µs). The low power ratio for this example is 4%. Thus, the PCIe bridge is in the low power state a minimal amount of time. In a worst case condition, for example, when each of the peripheral devices and the PCIe-bus-master capable modules generate data transfer requests once every predetermined period of time (e.g., once every 18 µs), the PCIe bridge may remain busy. For this reason, the PCIe bridge may not transition to the low power state.

For the example of FIG. 1, the effective bandwidth utilization is 39%. Since the effective bandwidth utilization of the PCIe bridge is 39%, 61% or the remainder of the total amount of time $T_{tot}$ to perform corresponding data transfer events may be used for entry latency periods, exit latency periods, and the low power state periods. However, data traffic through a PCIe bridge is not predictable because each peripheral device and PCIe-bus-master capable module, in communication with the PCIe bridge, can generate a data transfer request for a host system at any time. As a result, a total number of idle periods and durations of the idle periods are also unpredictable. No data is forwarded from the FIFO buffer during the idle periods. The PCIe bridge may be in the active state, the lower power state and/or may be transitioning between the active state and the low power state during an idle period. The idle periods, during which the PCIe bridge is in the active state and is not transitioning to or from the low power state, are referred to as idle slots (e.g., idle slots $T_{slot-12}$). The idle periods are often too short in length to: transition the PCIe bridge to; remain in for at least a predetermined amount of time; and transition back from the low power state.

In the given example, two transitions to and from lower power states are shown. With a total amount of time $T_{tot}$ to perform the data transfer events, an entry latency of (e.g., 2 µs) per transition to the low power state, and an exit latency of (e.g., 16 µs) per transition from the low power state, the total time associated with transitioning between the active states and the lower power states is approximately one-third of the total amount of time $T_{tot}$ to perform the corresponding data transfer events. As a result, a large portion of the total amount of time $T_{tot}$ to perform the corresponding data transfer events includes the idle periods, the entry latency periods and the exit latency periods.

The following disclosed examples include communication systems with corresponding data management modules and bridges, which are configured to: minimize a number of transitions between an active state and a low power state; increase a total amount of time a bridge is in the low power state; maximize bandwidth utilization during the active state, and minimize a number of idle periods during which the bridge is in the active state and is not transferring data.

Figure 2:
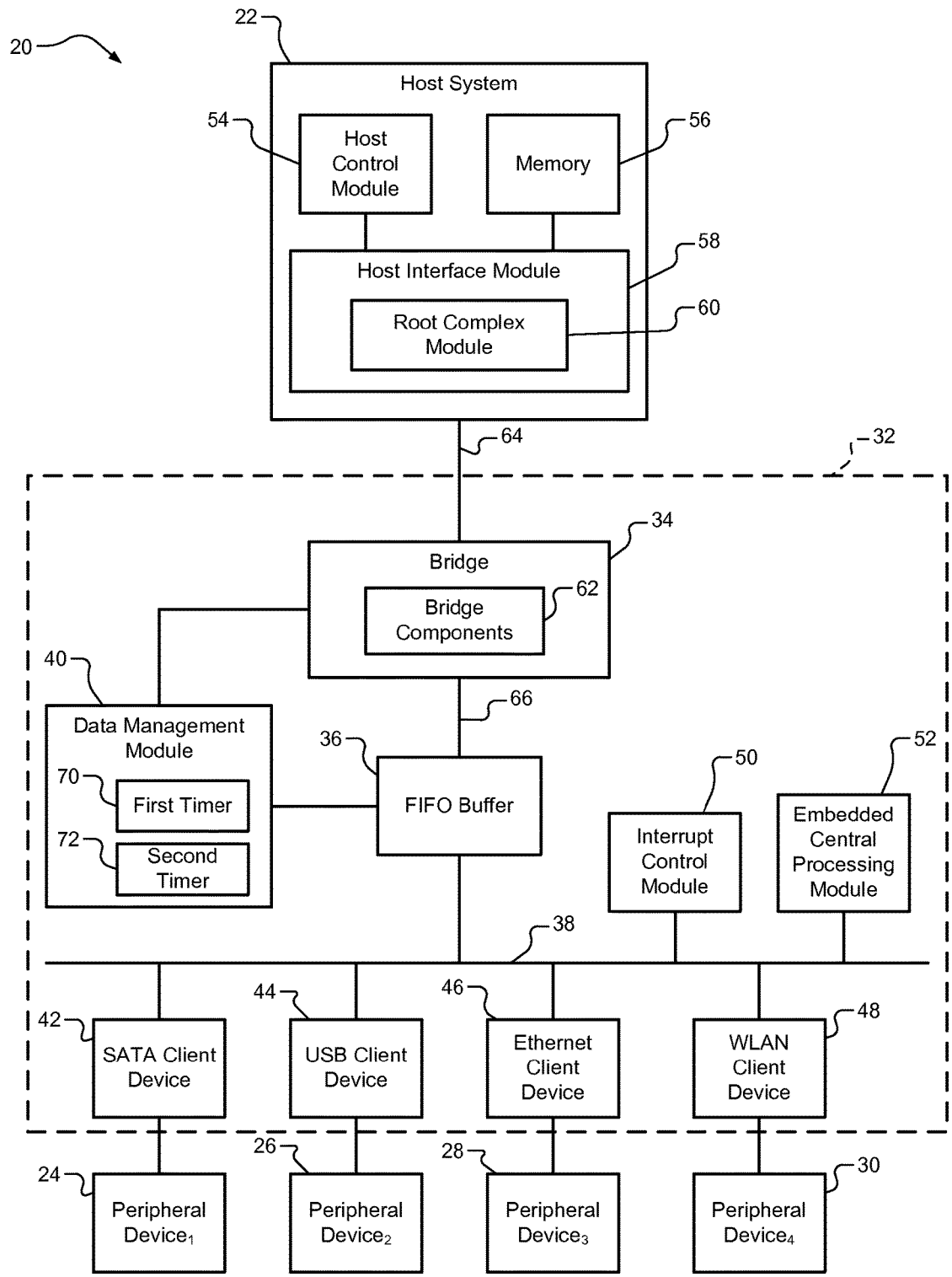
FIG. 2 is a functional block diagram of a communication system incorporating a data management module between a bridge and a FIFO buffer in accordance with the present disclosure.

FIG. 2 shows a communication system 20 for interconnecting a host system 22 to peripheral devices 24, 26, 28 and 30. The peripheral devices 24-30 may include storage drives, printers, camera, input/output (I/O) devices (e.g., a keyboard, a mouse, or a display), etc. Any number of peripheral devices may be included. The communication system 20 and/or portions of the communication system 20 may be implemented in one or more integrated circuits, a network device, a computer, a server, a mobile device, a tablet, and/or other computing device. The communication system 20 includes the host system 22 and an interconnect circuit 32. The interconnect circuit 32 may be implemented as one or more integrated circuits.

The interconnect circuit 32 includes a bridge (e.g., a PCIe bridge) 34, one or more FIFO buffers (one FIFO buffer 36 is shown), a bus 38, a data management module 40, client devices 42, 44, 46, 48 and client modules 50, 52. The client devices 42-48 may include a SATA client device, a USB client device, an Ethernet client device, and a WLAN client device. The client devices 42-48 may be interfaces, which are each in communication with a respective one of the peripheral devices 24-30. For example, one of the client devices 42-48 may be a USB interface, which is connected to a USB device (e.g., a USB storage drive). The client modules 50-52 may include an interrupt control module, embedded central processing module (e.g., an embedded central processing unit (CPU)), and/or other bus-master capable modules. Any number of client devices and client modules may be included in the interconnect circuit 32.

The host system 22 includes a host control module 54, a memory 56 and a host interface module 58. The host interface module 58 may include a root complex module 60. The host interface module 58 and/or the root complex module 60 controls transfer of data (i) between the host control module 54 and the memory 56, (ii) between the host control module 54 and the bridge 34, and (iii) between the memory 56 and the bridge 34. The root complex module 60 may include one or more ports, which may be connected to the bridge 34. Although separate from the host control module 54, the root complex module 60 may be included in the host control module 54. The root complex module 60 may generate data transfer requests on behalf of the host control module 54 to transfer data between (i) the memory 56, and (ii) the client devices 42-48 and/or the client modules 50-52.

The bridge 34 may be a PCIe bridge, a USB bridge, or other suitable bridge. The bridge 34 may include bridge components 62, such as a physical layer (PHY) device, a medium access control (MAC) device, interfaces, a control module, or other bridge components. The bridge 34 is connected between (i) the FIFO buffers, and (ii) the host interface module 58 and root complex module 60. The bridge 34 is connected via a first link (PCIe link) 64 to the root complex module 60. The bridge 34 may be connected to the FIFO buffers via one or more links (e.g., one or more PCIe links). A single link 66 is shown between the bridge 34 and the FIFO buffer 36. The first link 64 and the links between the bridge 34 and the FIFO buffers may each include any number of lanes. As an example, each lane may include two conductors for respectively receiving and transmitting data.

The FIFO buffers buffer data including user data, data transfer requests, and control information transferred between (i) the host system 22, the host control module 54, the root complex module 60, and/or the memory 56, and (ii) the client devices 42-48 and the client modules 50-52. The control information may include: control signals transferred from the host control module 54 to the peripheral devices 24-30; interrupts transmitted from the interrupt control module 50 to the host control module 54, and/or other control information. As an example, each of the FIFO buffers may include 16 kilo-bytes (kB) of memory to store data for 128 μs if: data throughput of each FIFO buffer is 1 giga-bit per second (Gbps), a corresponding entry latency period of the bridge 34 is 2 μs, and a corresponding exit latency period of the bridge 34 is 16 μs. Other predetermined FIFO buffer sizes, amounts of data to store in the FIFO buffers, data throughput speeds, entry latency periods, and exit latency periods may be associated with the bridge 34 and the FIFO buffers.

The bus 38 is connected to the FIFO buffers, the client devices 42-48 and the client modules 50-52. Data is transferred on the bus 38 between (i) the FIFO buffers, and (ii) the client devices 42-48 and/or the client modules 50-52. The bus 38 may be an AXI bus or other suitable bus.

The data management module 40 may be a data traffic gate controller and is connected between the bridge 34 and the FIFO buffers. The data management module 40 controls flow of data in and out of the FIFO buffers. The data management module 40 controls the flow of data based on data transfer requests from the host control module 54, the root complex module 60, the peripheral devices 24-30, the client devices 42-48, and the client modules 50-52. In one implementation, the data management module 40 is implemented as hardware.

In a traditional bridge, data transfer requests received from client devices at a PCIe bridge are stored in a FIFO buffer. The FIFO buffer is connected between the client devices and the PCIe bridge. Each of the data transfer requests are transferred to the PCIe bridge from the FIFO buffer upon being stored in the FIFO buffer. As a result, timing of the transfers of the data transfer requests between the FIFO buffer and the PCIe bridge is unpredictable.

The following examples improve predictability of the timing of data transfers. Although the following examples are primarily described with respect to the FIFO buffer 36, the examples may be applied to other FIFO buffers included in the interconnect circuit 32. The data management module 40 controls data traffic through the FIFO buffer 36 by gathering data including data transfer requests received from the host system 22, the client devices 42-48 and the client modules 50-52 in the FIFO buffer 36. The data is collected in the FIFO buffer 36 for a period of time without being transferred from the FIFO buffer 36 upon receipt by the FIFO buffer 36. As an example, the data may be collected in the FIFO buffer 36 for a predetermined period, and/or until the FIFO buffer 36 is filled to a predetermined level, and/or until no data is received at the FIFO buffer 36 for a predetermined period. Other example conditions for collecting data in the FIFO buffer 36 and preventing forwarding of data from the FIFO buffer 36 are disclosed below.

The data management module 40 controls turning on and off forwarding of data (i) between the FIFO buffer 36 and the bridge 34, and/or (ii) between the FIFO buffer 36 and the client devices 42-48 and/or client modules 50-52. The data management module 40 includes timers 70, 72, which are used in controlling the operate states of the bridge 34 and the turning on and off of the forwarding of data from the FIFO buffer 36. This control is performed based on certain conditions, which are described with respect to the method of FIG. 3.

Figure 3:
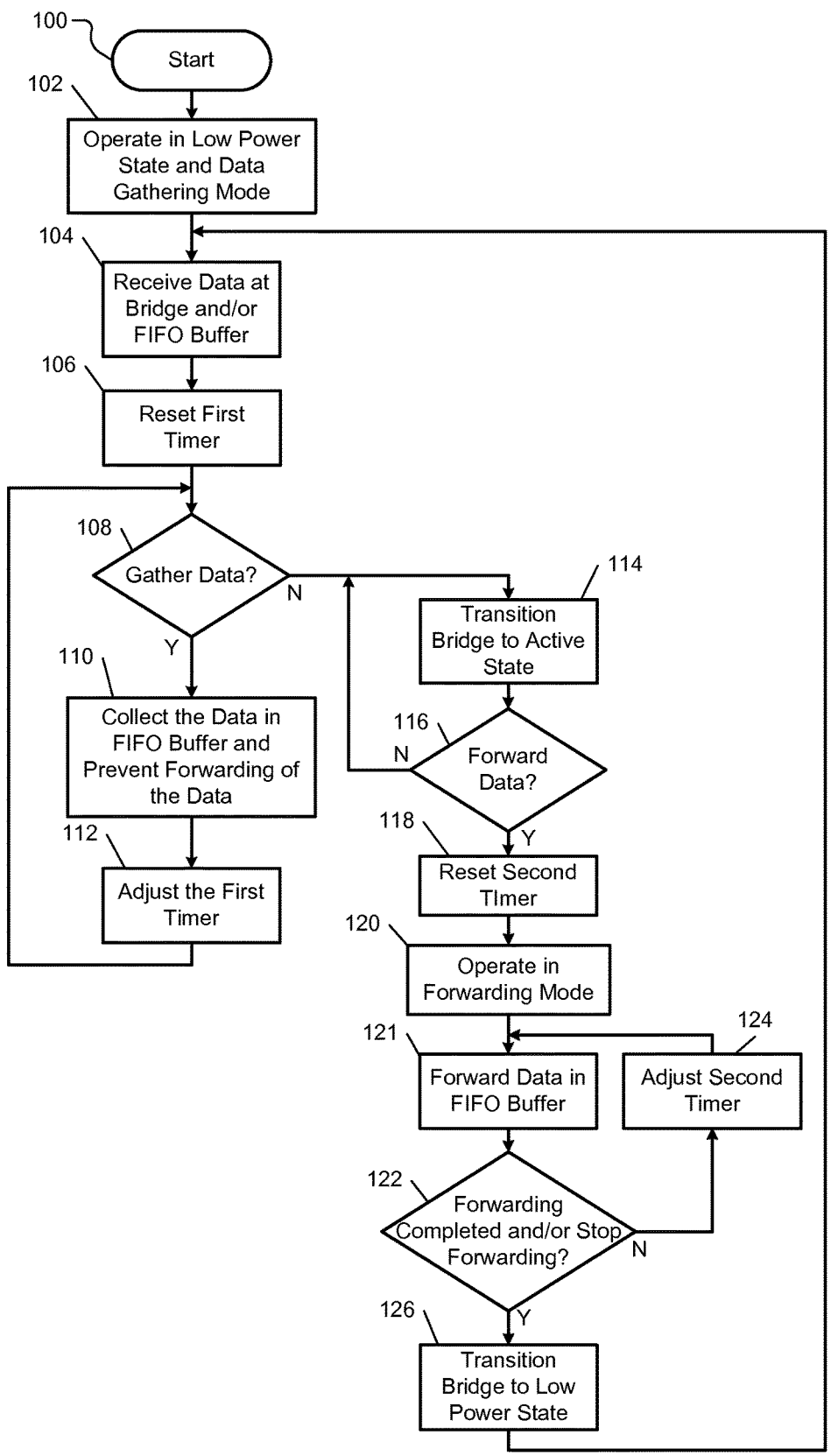
FIG. 3 illustrates a data management method in accordance with the present disclosure.

The communication system 20 disclosed herein may be operated using numerous methods. An example method is illustrated in FIG. 3. In FIG. 3, a data management method is shown. Although the following tasks are primarily described with respect to the implementations of FIGS. 2 and 4, the tasks may be modified to apply to other implementations of the present disclosure. The tasks may be iteratively performed. Although the tasks are primarily described with respect to the FIFO buffer 36, the tasks may be modified to apply to other FIFO buffers included in the interconnect circuit 32.

The method may begin at 100. At 102, the bridge 34 is operated in the low power state and the bridge 34, the FIFO buffer 36, and/or the data management module 40 are operated in the data gathering mode to collect data in the FIFO buffer 36. While in the low power state, one or more of the bridge components 62 and/or the first link 64 connected between the root complex module 60 and the bridge 34, and/or one or more of the links connected between the bridge 34 and the FIFO buffer 36 may be powered down and/or operated with a reduced amount of power. Clock gating to one or more of the bridge components 62 may be stopped. The FIFO buffer 36 is not forwarding data while operating in the data gathering mode. Data transfer requests and other data are collected in the FIFO buffer 36 until the data management module 40 turns on the forwarding of data from the FIFO buffer 36. This controls data traffic over, for example, the first link 64 connected between the root complex module 60 and the bridge 34 and/or the link 66 between the bridge 34 and the FIFO buffer 36 to provide longer idle times for reduced power consumption.

At 104, data is received at the bridge 34 from the host interface module 58 and/or at the FIFO buffer 36 from one or more of the client devices 42-48 and client modules 50-52. The data may include user data, data transfer requests, and/or control information. The data received at the bridge 34 may be forwarded to the FIFO buffer 36. At 106, the first timer 70 is reset. This may include setting a first timer value to a first predetermined value, which may be programmable.

At 108, the data management module 40 determines whether to continue operating in the data gathering mode to collect data in the FIFO buffer 36. The data management module 40 checks whether one or more of a first set of conditions exist. If none of the first set of conditions exists, then the data management module 40 operates the FIFO buffer 36 in the data gathering mode and task 110 is performed. If one or more of the first set of conditions exists, then task 114 is performed to transition the bridge 34 to the active state and trigger forwarding of data from the FIFO buffer 36. The amount of data collected while operating in the data gathering mode is limited based on whether one or more of the first set of conditions exists. The more data and/or data transfer requests collected in the FIFO buffer 36, the more efficiently the bandwidth of the link 66 can be utilized.

The first set of conditions may include: the first timer 70 being expired; a first timer value of the first timer 70 being greater than or equal to a first predetermined amount of time or a second predetermined value; a fill level of the FIFO buffer 36 being greater than or equal to a first predetermined fill level; an interrupt being received at the FIFO buffer 36 from the interrupt control module 50 or other device and/or module; a request being received from the host control module 54 to enable data forwarding; more than a first predetermined number of data transfer requests being received; and/or no data being received at the FIFO buffer 36 for a predetermined period. The first timer 70 may be used to implement a static timeout. If the FIFO buffer 36 is not empty and the first timer 70 has expired or exceeded the first predetermined amount of time (e.g., 200-300 μs) or the second predetermined value, task 114 is performed to turn on the forwarding of the data from the FIFO buffer 36. The first timer 70, the first predetermined amount of time, the second predetermined value and the first predetermined fill level are programmable.

The data management module 40 is configured to detect reception of an urgent request and/or interrupt at the bridge 34 and/or at the FIFO buffer 36. If an urgent request and/or interrupt is received and is associated with forwarding data, the data management module 40 performs task 114 to forward the urgent request and/or interrupt. This is done to quickly transition the bridge 34 and/or the link 66 to the active state. As an example, the urgent request and/or interrupt may be forwarded from the FIFO buffer 36 to the host control module 54 via the bridge 34.

The data management module 40 is also configured to detect a request from the host control module 54, the host interface module 58 and/or the root complex module 60 to transition from the low power state to the active state. This may occur, for example, when a software driver of the host system 22 reads a register of the bridge 34.

At 110, data is collected in the FIFO buffer 36 and prevented from being forwarded from the FIFO buffer 36. The data management module 40 may signal the FIFO buffer 36 not to forward data and/or signal the bridge 34 to disable forwarding of data from the FIFO buffer 36. Signaling the bridge 34 may disable data from being transferred between the bridge 34 and the FIFO buffer 36. At 112, the first timer 70 may be adjusted. In a first implementation, the first timer 70 is incremented towards the first predetermined value (e.g., a value greater than 0). In a second implementation, the first timer 70 is decremented towards the first predetermined value (e.g., 0). Task 108 is performed subsequent to task 112.

At 114, the data management module 40 signals the bridge 34 to transition to the active state. At 116, the data management module 40 determines whether the bridge 34 is in the active state. If the bridge 34 is in the active state, task 118 is performed, otherwise task 114 is performed. At 118, the second timer 72 is reset. This may include setting a second timer value to a third predetermined value, which may be programmable.

At 120, the data management module 40 operates in a forwarding mode and signals the FIFO buffer 36 to forward data and/or signals the bridge 34 to enable forwarding of data from the FIFO buffer 36. At 121, the FIFO buffer 36 forwards data stored in the FIFO buffer 36 to one or more of the host interface module 58, the client devices 42-48, and/or the client modules 50-52. While in the forwarding mode, some or all of the data collected in the FIFO buffer 36 may be forwarded prior to returning to the data gathering mode. In one implementation, the data management module 40 continues to operate in the forwarding mode until all of the data, including all pending data transfer requests, collected in the FIFO buffer 36 are forwarded. While in the forwarding mode, the FIFO buffer 36 may continue to receive data.

At 122, the data management module 40 determines whether one or more of a second set of conditions exists. If none of the second set of conditions exists, then the data management module 40 continues to operate the FIFO buffer 36 and/or the bridge 34 in the forwarding mode and task 124 is performed. If one or more of the second set of conditions exists, then task 126 is performed.

The second set of conditions may include: the second timer 72 being expired; a second timer value of the second timer 72 being greater than or equal to a second predetermined amount of time or a fourth predetermined value; the fill level of the FIFO buffer 36 is less than or equal to a second predetermined fill level; an interrupt being received at the FIFO buffer 36 from the interrupt control module 50 or other device and/or module; a request being received from the host control module 54 to disable data forwarding; and more than a second predetermined number of data transfer requests being forwarded and/or satisfied. If the FIFO buffer 36 is not empty and the second timer 72 has expired or exceeded the second predetermined amount of time or fourth predetermined value, task 126 is performed to turn off the forwarding of the data from the FIFO buffer 36. The second timer 72, the second predetermined amount of time, the fourth predetermined value and the second predetermined fill level are programmable.

If an urgent request and/or interrupt is received and the data management module 40 determines based on the urgent request and/or interrupt to stop forwarding data, the data management module 40 performs task 126 to stop forwarding data. This is done to quickly transition the bridge 34 and/or the link 66 to the low power state. As an example, the urgent request and/or interrupt may be associated with an error and/or detection of invalid, unpermitted, and/or unwarranted data. The data management module 40 is also configured to detect a request from the host control module 54, the host interface module 58 and/or the root complex module 60 to transition between from the active state to the low power state.

In one implementation, the data management module 40 at 122 determines (i) whether the FIFO buffer 36 is empty, and (ii) whether the second timer 72 has expired or exceeded the second predetermined amount of time or the second predetermined value. If the FIFO buffer 36 is empty and the second timer 72 has expired or exceeded the second predetermined amount of time or the second predetermined value, then task 126 is performed. If the FIFO buffer 36 is not empty, task 124 may be performed. If the FIFO buffer 36 is empty and the second timer 72 has not expired or exceeded the second predetermined amount of time or the second predetermined value, then the data management module 40 may wait until the second timer has expired or exceeded the second predetermined amount of time or the second predetermined value before performing task 126.

At 124, the second timer 72 is adjusted. The second timer 72 may be adjusted. In a first implementation, the second timer 72 is incremented towards the second predetermined value (e.g., a value greater than 0). In a second implementation, the second timer 72 is decremented towards the second predetermined value (e.g., 0). Task 121 is performed subsequent to task 124.

At 126, the data management module 40 signals the bridge 34 to transition to the low power state to stop the forwarding of data from the FIFO buffer 36. The data management module 40 may signal the FIFO buffer 36 to stop the forwarding of data from the FIFO buffer 36. The data management module 40, the bridge 34, and/or the FIFO buffer 36 may be transitioned to operating in the data gathering mode. Task 104 may be performed subsequent to task 126.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

Figure 4:
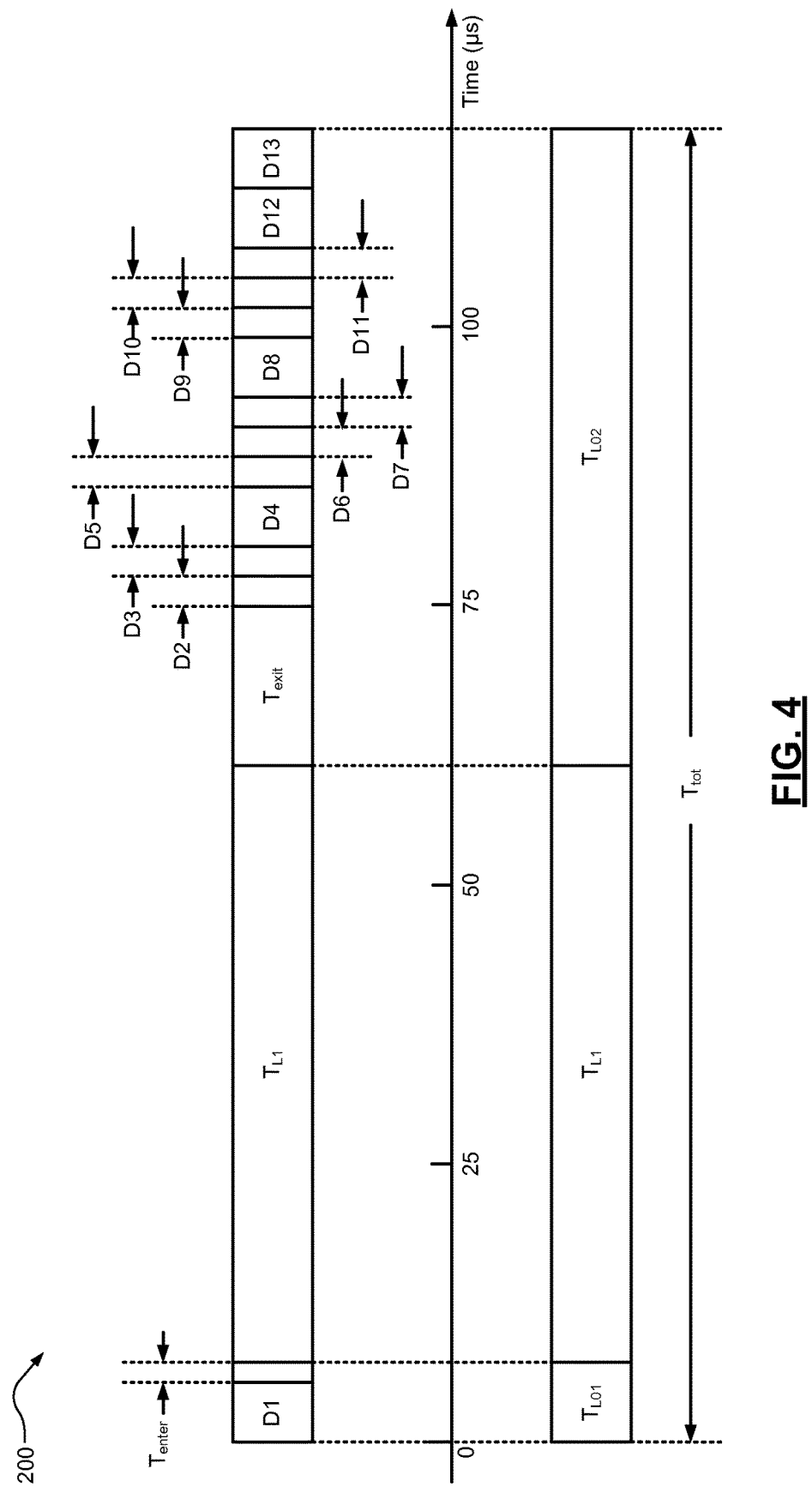
FIG. 4 is a timing diagram illustrating an example of bandwidth utilization and a low power ratio for the bridge of FIG. 2.

FIG. 4 shows a timing diagram 200 illustrating an example of bandwidth utilization and a low power ratio for the bridge 34 of FIG. 2 due to the control provided by the data management module 40. Active state periods $T_{L01-2}$, a low power state period $T_{L1}$, an entry latency period $T_{enter}$, an exit latency period $T_{exit}$, and data transfer event periods D1-13 are identified. For the example of FIG. 4: a total amount of time $T_{tot}$ to perform the data transfer events D1-13 is 115 μs; the entry latency period $T_{enter}$ to transition the bridge 34 to the low power state is 2 μs in length; and the exit latency period $T_{exit}$ to transition the bridge 34 from the low power state is 16 μs in length. Each data transfer event may include transferring a respective data transfer request and/or data of the corresponding data transfer request.

The data throughput for the example of FIG. 4 is the same data throughput as the example of FIG. 1. As a result, the bandwidth utilization is the same or 39%. However, subsequent to completing the first data transfer request, the data management module 40 stops the forwarding of data from the FIFO buffer 36 and transitions the bridge 34 to the low power state (e.g., the L1 state). This may include transitioning the link 66 between the bridge 34 and the FIFO buffer 36 to the low power state. The FIFO buffer 36 than collects data. If one or more of the first set of conditions exists, the data management module 40 turns on the forwarding of data from the FIFO buffer 36. This initiates a transition of the link 66 into the active state (e.g., the L0 state). Data transfer events are then performed without idle time slots between the data transfer events periods D2-13. As an example, the data transfer events periods D2-13 may include transferring data between the host system 22 and the bridge 34. The FIFO buffer 36 may be empty at the end of the last data transfer event period D13.

Comparing results between the examples of FIGS. 1 and 4, during the total amount of time $T_{tot}$ to perform the data transfer events, the following improvements are provided for the example of FIG. 4. The low power ratio or the total amount of idle time where a bridge is operating in a low power state increased from 4% to 48%. For the example of FIG. 4, a full bandwidth of the bridge 34 is utilized during the active state on the link 66. This minimizes the number of time slots during the active state in which data is not being transferred. The number of transitions of the bridge 34 into the low power state is decreased. In the example of FIG. 4, the total amount of transition time (or $T_{enter}+T_{exit}$) is 15.7%, as opposed to 31.3%. As a result, the bridge 34 is in the low power state for a longer period of time, which results in less power consumption associated with the links of the bridge 34.

The above-disclosed examples reduce power consumption of a bridge and corresponding links and, as a result, power consumption of a system in which the bridge is implemented. The examples maximize idle time of the bridge and maximize effective bandwidth utilization of the bridge and/or of one or more links of the bridge while the links are in an active state. The examples also minimize the number of idle periods without data transfers (or idle time slots) to minimize the number of transitions between the active state and a low power state. The features of the above-disclosed examples may be implemented in a single endpoint device (e.g., a device that includes the bridge, the data management module, and the FIFO buffer). The associated power savings are provided independent of and/or without the transfer of additional messages between endpoint devices.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A system comprising:
    a bus connected to a plurality of devices;
    a buffer connected to the bus, wherein the buffer is configured to transfer data to or receive the data from one or more of the plurality of devices, forward the data during a forwarding mode, and receive the data during a gathering mode, wherein the data includes first data and second data;
    a bridge configured to operate in an active state and a low power state, wherein the bridge is in the active state while the buffer is in the forwarding mode and in the low power state while the buffer is in the gathering mode; and
    a module configured to
        receive a first transfer request for the first data,
        operate the bridge to transfer the first data,
        transition from the forwarding mode to the gathering mode subsequent to transferring the first data,
        maintain the buffer in the gathering mode until a predetermined number of transfer requests have been received, wherein each of the predetermined number of transfer requests corresponds to a respective portion of the second data,
        determine whether a first condition exists including determining whether the predetermined number of transfer requests for the second data have been received,
        if the first condition exists, configure the bridge to transfer the second data from the buffer to a host system or transition the buffer from the gathering mode to the forwarding mode to forward the second data from the buffer to the one or more of the plurality of devices,
        wherein the bridge or the buffer, while the buffer is in the forwarding mode, consecutively transfers the respective portions of the second data such that no idle period exists between consecutive ones of the transfers of the respective portions of the second data, wherein the idle period refers to a temporary period when the bridge ceases transferring the second data and the buffer ceases forwarding the second data,
        determine whether a second condition exists, and
        based on whether the second condition exists, transition the buffer from the forwarding mode to the gathering mode.

2. The system of claim 1, wherein the plurality of devices comprise a plurality of client devices and a plurality of client modules.

3. The system of claim 1, wherein the plurality of devices comprise an Ethernet device, a universal serial bus device, a serial advanced technology attachment device, and a wireless local area network device.

4. The system of claim 1, wherein the plurality of devices comprise an interrupt controller and an embedded central control module.

5. The system of claim 1, wherein:
the buffer does not forward the first data and the second data during the gathering mode;
during the active state, the bridge is configured to transfer the first or the second data from the buffer to the host system or the buffer is configured to forward the first or the second data to the one or more of the plurality of devices; and
the module is configured to
in determining whether the first condition exists, determine whether a timer has expired or a value of the timer is greater than or equal to a predetermined value, and
if the timer has expired or the value of the timer is greater than or equal to the predetermined value, transition the bridge from the low power state to the active state and transition the buffer from the gathering mode to the forwarding mode.

6. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the first condition exists, determine whether a fill level of the buffer is greater than or equal to a predetermined fill level, and
if the fill level of the buffer is greater than or equal to the predetermined fill level, transition the bridge from the low power state to the active state and transition the buffer from the gathering mode to the forwarding mode.

7. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the first condition exists, determine whether an interrupt has been received by the bridge or the buffer, and
if an interrupt has been received at the bridge or buffer, transition the bridge from the low power state to the active state and transition the buffer from the gathering mode to the forwarding mode.

8. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the first condition exists, determine whether a request has been received by the bridge from the host system to enable data forwarding, and
if the request has been received by the bridge, transition the bridge from the low power state to the active state and transition the buffer from the gathering mode to the forwarding mode.

9. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the first condition exists, determine whether no data has been received by the buffer for a predetermined period, and
if no data has been received by the buffer for the predetermined period, transition the bridge from the low power state to the active state and transition the buffer from the gathering mode to the forwarding mode.

10. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
determine whether a plurality of conditions exist, wherein the plurality of conditions include the first condition, and
if the plurality of conditions exist, transition the bridge from the low power state to the active state and transition the buffer from the gathering mode to the forwarding mode.

11. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the second condition exists, determine whether a timer has expired or a value of the timer is greater than or equal to a predetermined value, and
if the timer has expired or the value of the timer is greater than or equal to the predetermined value, transition the bridge from the active state to the low power state and transition the buffer from the forwarding mode to the gathering mode.

12. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the second condition exists, determine whether a fill level of the buffer is less than a predetermined fill level, and if the fill level of the buffer is less than the predetermined fill level, transition the bridge from the active state to the low power state and transition the buffer from the forwarding mode to the gathering mode.

13. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the second condition exists, determine whether an interrupt has been received by the bridge or the buffer, and
if an interrupt has been received by the bridge or the buffer, transition the bridge from the active state to the low power state and transition the buffer from the forwarding mode to the gathering mode.

14. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the second condition exists, determine whether a request has been received by the bridge from the host system to disable data forwarding, and
if the request has been received by the bridge from the host system to disable data forwarding, transition the bridge from the active state to the low power state and transition the buffer from the forwarding mode to the gathering mode.

15. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
in determining whether the second condition exists, determine whether more than the predetermined number of transfer requests have been forwarded from the buffer or satisfied, and
if more than the predetermined number of data transfer requests have been forwarded from the buffer or satisfied, transition the bridge from the active state to the low power state and transition the buffer from the forwarding mode to the gathering mode.

16. The system of claim 1, wherein:
the buffer does not forward the first data and the second data during the gathering mode;
during the active state, the bridge is configured to transfer the first data or the second data from the buffer to the host system or the buffer is configured to forward the first data or the second data to the one or more of the plurality of devices; and
the module is configured to
determine whether a plurality of conditions exist, wherein the plurality of conditions include the second condition, and
if the plurality of conditions exist, transition the bridge from the active state to the low power state and transition the buffer from the forwarding mode to the gathering mode.

17. The system of claim 1, wherein the buffer receives and stores the predetermined number of transfer requests while operating in the gathering mode.

18. The system of claim 1, wherein the bridge is a peripheral component interconnect express bridge.

19. A method comprising:
via a buffer, transferring data to or receiving the data from a plurality of devices, wherein the data is received at the buffer during a gathering mode and forwarded from the buffer during a forwarding mode, wherein the buffer is connected to the plurality of devices via a bus, and wherein the data includes first data and second data;
receiving a first transfer request for the first data;
operating a bridge to transfer the first data, wherein the bridge is configured to operate in an active state and a low power state, wherein the bridge is in the active state while the buffer is in the forwarding mode and in the low power state while the buffer is in the gathering mode;
transitioning from the forwarding mode to the gathering mode subsequent to transferring the first data,
maintaining the buffer in the gathering mode until a predetermined number of transfer requests have been received, wherein each of the predetermined number of transfer requests corresponds to a respective portion of the second data,
determining whether a first condition exists including determining whether the predetermined number of transfer requests for the second data have been received;
if the first condition exists, transferring the second data from the buffer to a host system via the bridge or transitioning the buffer from the gathering mode to the forwarding mode to forward the second data from the buffer to the one or more of the plurality of devices;
while the buffer is in the forwarding mode, consecutively transferring the respective portions of the second data via the bridge or the buffer such that no idle period exists between consecutive ones of the transfers of the respective portions of the second data, wherein the idle period refers to a temporary period when the bridge ceases transferring the second data and the buffer ceases forwarding the second data;
determining whether a second condition exists; and
based on whether the second condition exists, transitioning the buffer from the forwarding mode to the gathering mode.

20. The method of claim 19, further comprising:
forwarding the first data or the second data from the buffer during the forwarding mode, wherein the first data and the second data are not forwarded from the buffer during the gathering mode;
during the active state, transferring the first data or the second data from the buffer to the host system via the bridge or forwarding the first data or the second data from the buffer to the one or more of the plurality of devices;
determining whether a plurality of conditions exist, wherein the plurality of conditions include the first condition, a timer being expired, a value of the timer being greater than or equal to a predetermined value, no data being received by the buffer for a predetermined period, a fill level of the buffer being greater than or equal to a predetermined fill level, an interrupt being received by the bridge or the buffer, and a request being received by the bridge from the host system to enable data forwarding; and if the plurality of conditions exist, transitioning the bridge from the low power state to the active state and transitioning the buffer from the gathering mode to the forwarding mode.

21. The method of claim 19, further comprising:

forwarding the first data or the second data from the buffer during the forwarding mode, wherein the first data and the second data is not forwarded from the buffer during the gathering mode;

during the active state, transferring the first data or the second data from the buffer to the host system via the bridge or forwarding the first data or the second data from the buffer to the one or more of the plurality of devices;

determining whether a plurality of conditions exist, wherein the plurality of conditions include the second condition, a timer being expired, a value of the timer being greater than or equal to a predetermined value, a fill level of the buffer being less than or equal to a predetermined fill level, an interrupt being received by the bridge or the buffer, a request being received by the bridge from the host system to disable data forwarding, and more than the predetermined number of transfer requests being forwarded from the buffer or satisfied; and if the plurality of conditions exist, transitioning the bridge from the active state to the low power state and transitioning the buffer from the forwarding mode to the gathering mode.

22. The method of claim 19, further comprising:

forwarding the first data or the second data from the buffer during the forwarding mode, wherein the first data and the second data are not forwarded from the buffer during the gathering mode;

during the active state, transferring the first data or the second data from the buffer to the host system via the bridge or forwarding the first data or the second data from the buffer to the one or more of the plurality of devices;

determining whether a first plurality of conditions exist, wherein the first plurality of conditions include the first condition;

if the first plurality of conditions exist, transitioning the bridge from the low power state to the active state and transitioning the buffer from the gathering mode to the forwarding mode;

determining whether a second plurality of conditions exist, wherein the second plurality of conditions include the second condition; and if the second plurality of conditions exist, transitioning the bridge from the active state to the low power state and transitioning the buffer from the forwarding mode to the gathering mode.

* * * * *